United States Patent
Menase

(10) Patent No.: US 10,291,527 B2
(45) Date of Patent: May 14, 2019

(54) FRAGMENTED PACKET PROCESSING RESOURCE DETERMINATION

(71) Applicants: Hewlett Packard Enterprise Development LP, Houston, TX (US); Laurent Menase, Les Ulis (FR)

(72) Inventor: Laurent Menase, Les Ulis (FR)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/534,877

(22) PCT Filed: Jul. 30, 2015

(86) PCT No.: PCT/EP2015/067609
§ 371 (c)(1),
(2) Date: Jun. 9, 2017

(87) PCT Pub. No.: WO2016/091402
PCT Pub. Date: Jun. 16, 2016

(65) Prior Publication Data
US 2017/0324663 A1    Nov. 9, 2017

(30) Foreign Application Priority Data
Dec. 11, 2014   (EP) .................................... 14197500

(51) Int. Cl.
*H04L 12/743*   (2013.01)
*H04L 29/06*    (2006.01)

(52) U.S. Cl.
CPC ........ *H04L 45/7453* (2013.01); *H04L 69/166* (2013.01)

(58) Field of Classification Search
CPC ........ H04W 80/04; H04W 8/26; H04L 12/56; H04L 2012/56; H04L 29/0653;
(Continued)

(56) References Cited

U.S. PATENT DOCUMENTS 7,424,014 B2   9/2008   Mattes et al.
7,835,356 B2   11/2010  Bar-Kovetz et al.
(Continued)

FOREIGN PATENT DOCUMENTS

GB    2399199    9/2004

OTHER PUBLICATIONS

European Patent Office, "Extended European Search Report", 14197500.3, dated Jun. 19, 2015, 7 pages.
(Continued)

*Primary Examiner* — Brenda H Pham
(74) *Attorney, Agent, or Firm* — Hewlett Packard Enterprise Patent Department

(57) ABSTRACT

Example implementations relate to fragmented packet processing resource determination. For example, an apparatus includes a processor receive an initial fragmented packet from a source device. The initial fragmented packet includes a first header and a second header. The processor is also to generate a first hash value based on the first header and based on the second header. The processor is further to determine an initial fragmented packet processing resource based on the first hash value and to generate a second hash value based on the first header. The processor is further to associate the second hash value with the processing resource and transmit the initial fragmented packet to the initial fragmented packet processing resource.

15 Claims, 5 Drawing Sheets

(58) Field of Classification Search
CPC ........... H04L 29/06095; H04L 49/3009; H04L 49/309; H04L 45/74; H04L 2012/5652; H04J 3/076
USPC ................ 370/349, 389, 392, 373, 471, 473
See application file for complete search history.

(56) References Cited

U.S. PATENT DOCUMENTS

| | | | |
|---|---|---|---|
| 8,009,682 B2 | 8/2011 | Gopinath et al. | |
| 8,170,061 B2 | 5/2012 | Abe et al. | |
| 8,243,618 B2 | 8/2012 | Battestilli et al. | |
| 8,644,339 B1* | 2/2014 | Krishna | H04W 28/065 370/471 |
| 2004/0210669 A1 | 10/2004 | Lee | |
| 2010/0254391 A1 | 10/2010 | Kramer et al. | |
| 2013/0336329 A1 | 12/2013 | Gopinath et al. | |
| 2014/0079076 A1 | 3/2014 | Kamble et al. | |
| 2014/0301388 A1* | 10/2014 | Jagadish | H04L 45/7453 370/389 |
| 2016/0072767 A1* | 3/2016 | Patel | H04L 61/2514 709/245 |

OTHER PUBLICATIONS

International Searching Authority, "Notification of Transmittal of The International Search Report and The Written Opinion", PCT/EP2015/067609, dated Sep. 9, 2015 11 pages.
Unknown, Feature: Packet Fragment Reassembly, VSS Monitoriung, Dec. 14, 2011, 3 Pages.

* cited by examiner

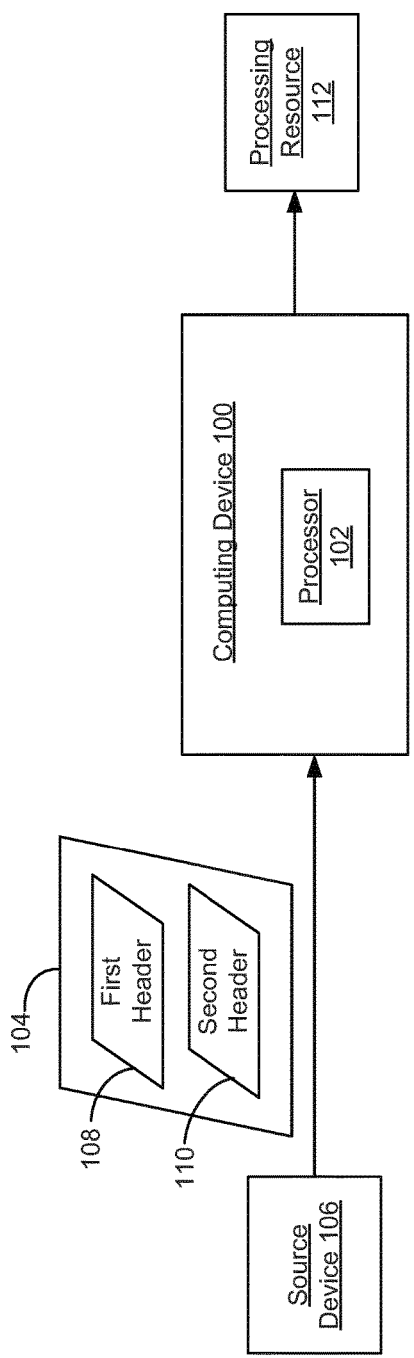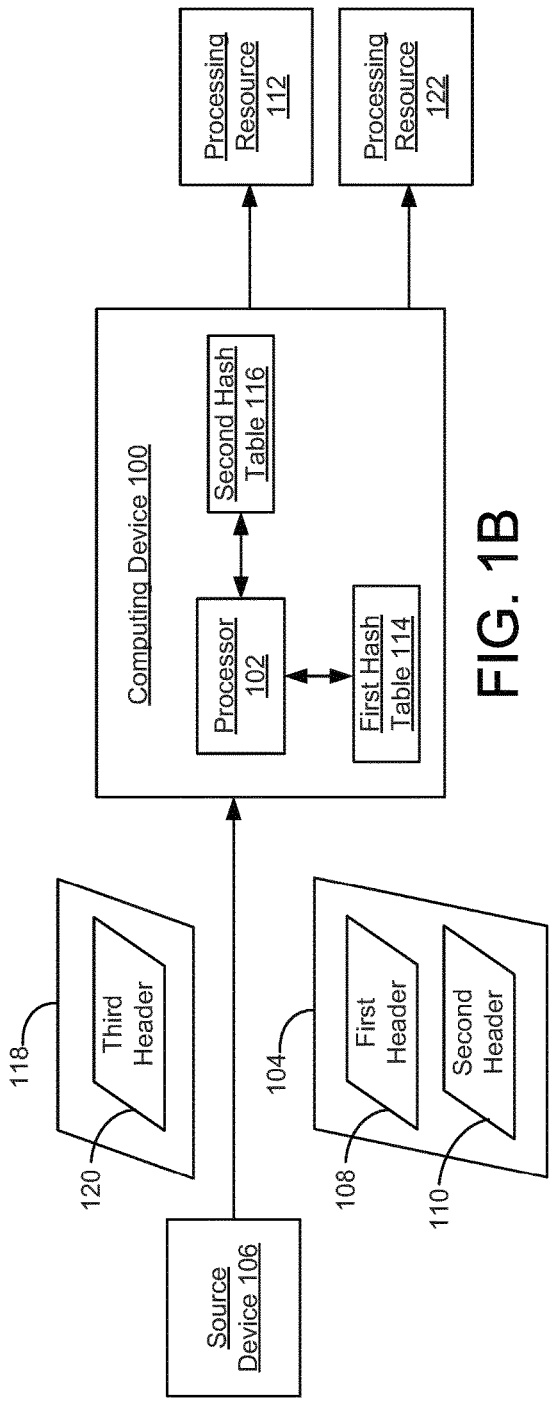

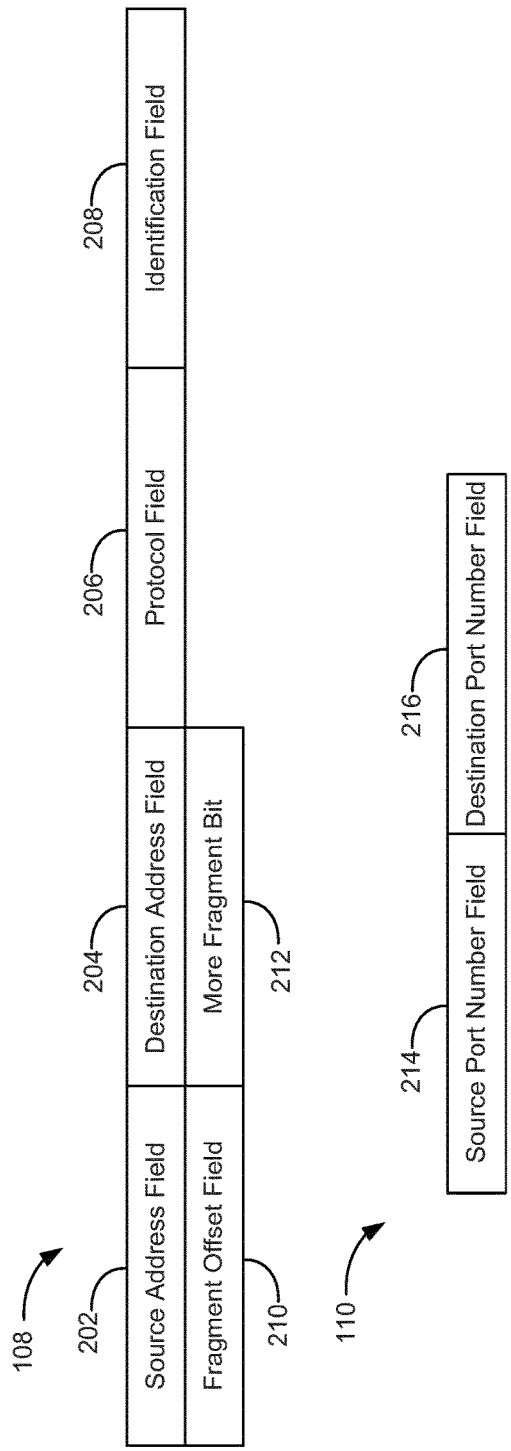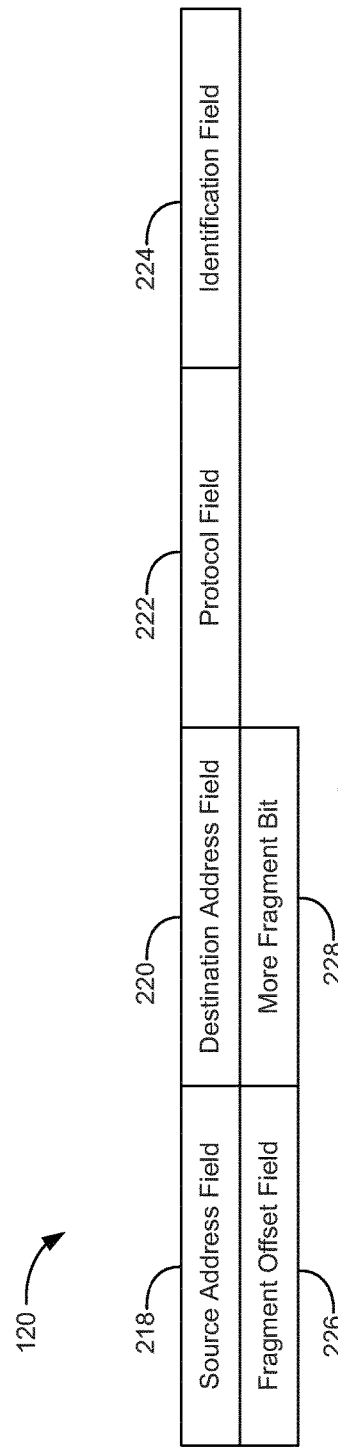
FIG. 2A
FIG. 2B

FRAGMENTED PACKET PROCESSING RESOURCE DETERMINATION

BACKGROUND

Computing devices, such as server computers, may communicate data with each other using packets. A plurality of protocols may be used to transmit a packet. One example protocol may be transmission control protocol (TCP). Another example protocol may be user datagram protocol (UDP).

BRIEF DESCRIPTION OF THE DRAWINGS

Some examples of the present application are described with respect to the following figures:

FIGS. 1A-1B are block diagrams of a computing device to determine an initial fragmented packet processing resource based on a first hash value and to determine a subsequent fragmented packet processing resource based on a different hash value, according to an example;

FIG. 2A is a diagram of a header portion of an initial fragmented packet including a first header and a second header, according to an example;

FIG. 2B is a diagram of a header portion of a subsequent fragmented pack including a third header, according to an example;

DETAILED DESCRIPTION

Figure 3:
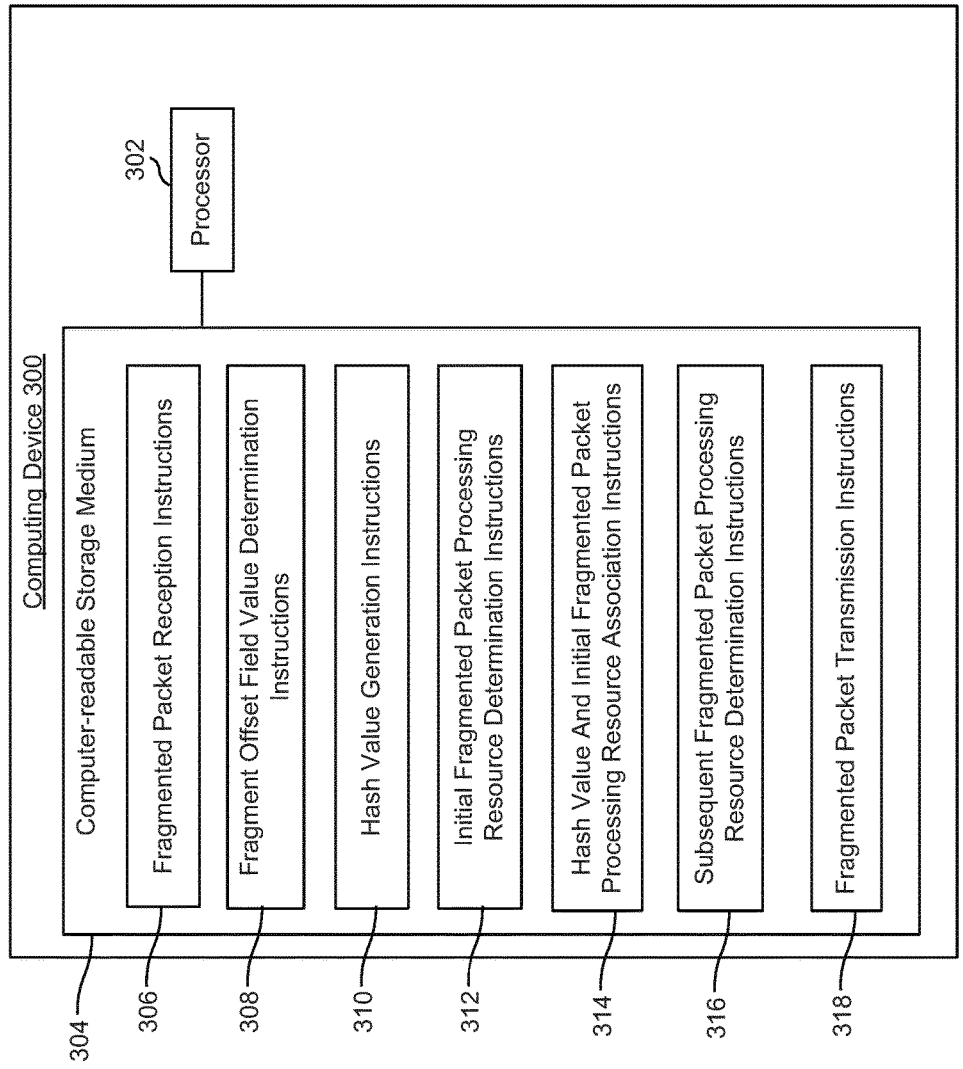
FIG. 3 is a block diagram of a computing device to determine an initial fragmented packet processing resource based on a first hash value and to determine a subsequent fragmented packet processing resource based on a different hash value, according to an example.

When a data block is too large to be transmitted as a single packet, the data block may be broken up into a plurality of fragmented packets. When the plurality of fragmented packets is received at the destination, such as a computing device, the plurality of fragmented packets may be combined to reassemble the data block. When a computing device having a plurality of processing resources available, such as a plurality of processors or a plurality of execution threads implemented using processor executable instructions, the computing device may process each fragmented packet of a packet in an agnostic manner. Thus, a fragmented packet may be processed by a first processing resource and another fragmented packet may be processed by a different processing resource. When the fragmented packets are to be combined to reassemble the data block, the plurality of processing resources may be coordinated so that a single processing resource may receive all the fragmented packets to reassemble the data block. Thus, an efficiency associated with processing fragmented packets may be reduced.

Examples described herein provide a computing device to determine a processing resource of a fragmented packet based on a first hash value and based on a second hash value. For example, a computing device may receive a fragmented packet from a source device. The fragmented packet may include a first header and a second header. The computing device may also generate a first hash value based on the first header and based on the second header. The computing device may further determine a processing resource based on the first hash value. The computer device may further generate a second hash value based on the first header. The computer device may further associate the second hash value with the processing resource and transmit the fragmented packet to the processing resource. In this manner, examples described herein may increase an efficiency associated with processing fragmented packets.

Referring now to the figures, FIGS. 1A-1B are block diagrams of a computing device 100 to determine an initial fragmented packet processing resource based on a first hash value and to determine a subsequent fragmented packet processing resource based on a different hash value, according to an example.

Referring to FIG. 1A, computing device 100 may be, for example, a multi-core computer, a computer implementing multi-thread processing, a web-based server, a local area network server, a cloud-based server, a notebook computer, a desktop computer, an all-in-one system, a tablet computing device, a mobile phone, or any other electronic device suitable for determining a processing resource of a fragmented packet.

Computing device 100 may include a processor 102. Processor 102 may be a central processing unit (CPU), a semiconductor-based microprocessor, and/or other hardware devices suitable for retrieval and execution of instructions stored in a computer-readable storage medium (not shown in FIG. 1A). Processor 102 may fetch, decode, and execute instructions to control a process of determining a processing resource of a fragmented packet based on at least a header of the fragmented packet.

Computing device 100 may determine a processing resource, such as a processor and/or an executing thread implemented using processor executable instructions, for each received fragmented packet. Computing device 100 may determine a processing resource for a particular fragmented packet based on whether the particular fragmented packet is an initial fragmented packet of a packet or a subsequent fragmented packet of the packet.

During operation, computing device 100 may receive a first fragmented packet 104 from a source device 106. Source device 106 may be similar to computing device 100. First fragmented packet 104 may be a packet containing a partial content of a data block. First fragmented packet 104 may be an initial fragmented packet. An initial fragmented packet may contain in the payload a beginning (i.e., first) fragment of the data block in terms of positioning within the data block relative to other fragments of the data block. First fragmented packet 104 may include a fragment offset field having a first value of to indicate that first fragmented packet 104 is an initial fragmented packet. For example, the first value may be null (e.g. a value of 0). Thus, first fragmented packet 104 may be identified as an initial fragmented packet by computing device 100 based on the value of the fragment offset field. In some examples, first fragmented packet 104 may be transmitted by source device 106 before other fragmented packets of the data block.

First fragmented packet 104 may include two headers, such as first header 108 and a second header 110, in a header portion of first fragmented packet 104. First header 108 may include a first set of fields. For example, the first set of fields may include a source address field, a destination address field, a protocol field, an identification field, the fragment offset field, and a more fragment bit. Second header 110 may include a second set of fields. For example, the second set of fields may include a source port number field and a destination port number field. Examples of first header 108 and second header 110 are described in more detail in FIG. 2A. In some examples, first header 108 may correspond to an Internet protocol (IP) header and second header 110 may correspond to a user datagram protocol (UDP) header. Thus, first header 108 and second header 110 may have different formats.

In response to a first determination that first fragmented packet 104 is an initial fragmented packet, computing device 100 may generate a first hash value based on first header 108 and based on second header 110. For example, computing device 100 may generate the first hash value using information/values from a first subset of the first set of fields of first header 108 and the second set of fields of second header 110. The first subset may include the source address field, the destination address field, and the protocol field. The second set of fields may include the source port number field and the destination port number field. The source address field, the destination address field, the protocol field, the source port number field, and the destination port number field may be referred to as a 5-tuple.

Computing device 100 may determine an initial fragmented packet processing resource, such a processing resource 112, to process first fragmented packet 104 based on the first hash value. Computing device 100 may transmit first fragmented packet 104 to processing resource 112 for processing and/or reassembly of the data block.

Referring to FIG. 1B, in some examples, computing device 100 may determine that processing resource 112 corresponds to the initial fragmented packet processing resource using a first hash table 114. First hash table 114 may indicate that when the first hash value is within a particular range, processing resource 112 is the initial fragmented packet processing resource. The first hash table may also indicate that when the first hash value is within another particular range, another processing resource (not shown in FIGS. 1A-1B) may be the initial fragmented packet processing resource. Processing resource 112 may correspond to a particular processor, an execution thread implemented using processor executable instructions, or a combination thereof.

In response to the first determination that first fragmented packet 104 is the initial fragmented packet, computing device 100 may also generate a second hash value based on first header 108. For example, computing device 100 may generate the second hash value using information/values from a second subset of the first set of fields of first header 108. In some examples, the second subset may include the source address field, the destination address field, the protocol field, and the identification field. The source address field, the destination address field, the protocol field, and the identification field may be referred to as a 4-tuple. In some examples, the second subset may include the source address field and the identification field. The source address field and the identification field may be referred to as a 2-tuple.

Computing device 100 may associate the second hash value with processing resource 112 via a second hash table 116. For example, computing device 100 may record the second hash value and an identification of processing resource 112 in the same row of second hash table 116 so that the second hash value is associated with processing resource 112. In some examples, second hash table 116 may be specific to the second hash value. Thus, second hash table 116 may be identified using the second hash value.

Computing device 100 may use second hash table 116 to determine a subsequent fragmented packet processing resource to process a subsequent fragmented packet, such as a second fragmented packet 118. A subsequent fragmented packet may contain a fragment of a data block that is offset from or subsequent to the beginning fragment of the data block in terms of positioning within the data block. Thus, second fragmented packet 118 may contain in the payload a fragment that is offset from or subsequent to the fragment contained in the payload of first fragmented packet 104.

Second fragmented packet 118 may include a fragment offset field having a second value to indicate that second fragmented packet 118 is a subsequent fragmented packet. Thus, second fragmented packet 118 may be identified as a subsequent fragmented packet by computing device 100 based on the value of the fragment offset field. The second value may be different than the first value in the fragment offset field of first header 108 of first fragmented packet 104. For example, the second value may be a non-zero value since 0 indicates an initial fragmented packet. The second value may also indicate the offset from the beginning fragment in the payload of first fragmented packet 104. For example, the second value may be 2. Thus, the fragment in the payload of second fragmented packet 118 may be two offset units away from the beginning fragment. For example, an offset unit may correspond to a 150-byte fragment.

Second fragmented packet 118 may include a third header 120. In some examples, third header 120 and first header 108 may be IP headers. Thus, third header 120 may have the same format as first header 108. In some examples, second fragmented packet 118 may include a single header in a header portion of second fragmented packet 118. An example of third header 120 is described in more detail in FIG. 2B.

In response to a determination that second fragmented packet 118 is a subsequent fragmented packet, computing device 100 may generate a third hash value using information/values from the third set of fields. In some examples, the third set of fields may be the 4-tuple. Thus, the third set of fields may include a source address field of the third header 120, a destination address field of the third header 120, a protocol field of the third header 120, and an identification field of the third header 120. In some examples, the third set of fields may be the 2-tuple. Thus, the third set of fields may include the source address field of the third header 120 and the identification field of the third header 120.

Computing device 100 may compare the third hash value to the second hash value using second hash table 116 to determine a subsequent fragmented packet processing resource. When the third hash value matches the second hash value, computing device 100 may determine that processing resource 112 may be the subsequent fragmented packet processing resource. The third hash value may match the second value when first fragmented packet 104 and second fragmented packet 118 are associated with the same data block. When the third hash value does not match the second hash value, computing device 100 may compare the third hash value to another hash value generated from another initial fragmented packet until a match is found. Computing device 100 may transmit second fragmented packet 118 to the subsequent fragmented packet processing resource.

Thus, by comparing a hash value generated from a tuple (e.g., the 4-tuple or the 2-tuple) of a subsequent fragmented packet to another hash value generated from the same of an initial fragmented packet, computing device 100 may enable the same processing resource to process all fragmented packets of a data block. The same processing resource may thus reassemble the data block using all the fragmented packets. Thus, an efficiency associated with processing fragmented packets may be increased.

In some examples, a subsequent fragmented packet associated with a data block may be received at computing device 100 prior to an initial fragmented packet associated with the data block. Thus, computing device 100 may transmit the earlier received subsequent fragmented packet to a first processing resource different from a second processing resource for the initial fragmented packet. However, any subsequent fragmented packet received after the initial fragmented packet is to be transmitted the second processing resource for processing and/or data block reassembly.

For example, referring to FIGS. 1A-1B, computing device 100 may receive second fragmented packet 118 prior to first fragmented packet 104, such as due to transmission delay or interference. Thus, computing device 100 may determine that a processing resource 122 is to process second fragmented packet 118 based on a hash value, such as the second hash value, generated using the 4-tuple of second fragmented packet 118. For example, computing device 100 may use second hash table 116 to determine the processing resource based on the hash value.

Computing device 100 may transmit second fragmented packet 118 to processing resource 122. Computing device 100 may receive first fragmented packet 104 after second fragmented packet 118 is received. Computing device 100 may determine processing resource 112 as a processing resource for first fragmented packet 104 as described above and may transmit first fragmented packet 104 to processing resource 112. Computing device 100 may also update second hash table 116 so that the second value is associated with processing resource 112 instead of processing resource 118. Thus, any subsequent fragmented packet received after first fragmented packet 118 is to be transmitted to processing resource 112 for processing and/or data block reassembly. During reassembly of the data block, processing resource 122 may store second fragmented packet 118 to a common storage location accessible by processing resource 112. Processing resource 112 may retrieve second fragmented packet 118 from the common storage location so that process resource 112 may have all the fragmented packets to reassemble the data block. Thus, a consistent processing resource may be used when the initial fragmented packet is received and the number of processing resources may be limited.

FIG. 2A is a diagram of a header portion of first fragmented packet 104 of FIG. 1 including first header 108 and second header 110, according to an example. First header 108 may include a plurality of fields. For example, first header 108 may include a source address field 202, a destination address field 204, a protocol field 206, an identification field 208, a fragmented offset field 210, and a more fragment bit 212.

Source address field 202 may indicate an address of a source of first fragmented packet 104, such as an Internet protocol (IP) address of source device 106. Destination address field 204 may indicate an address of a destination of first fragmented packet 104, such as an IP address of computing device 100. Protocol field 206 may indicate a particular protocol used in the data portion (e.g., payload) of the first fragmented packet 104. Identification field 208 may identify a data block that first fragmented packet 104 is generated from and may be used to identify all fragmented packets of the data block for reassembly.

Fragmented offset field 210 may indicate the positioning of the beginning fragment contained in first fragmented packet 104 within the data block relative to other fragments of the data block. Fragmented offset field 210 may also be used by computing device 100 to determine whether first fragmented packet 104 is an initial fragmented packet or a subsequent fragmented packet.

More fragment bit 212 may indicate whether first fragmented packet 104 contains the last fragment of the data block. When the last fragment has been received, reassembly of the data block may be performed. When the more fragment bit has a first value, more fragment bit 212 may indicate that there is at least one more fragmented packet be received by computing device 100 after first fragmented packet 104. When the more fragment bit has a second value, more fragment bit 212 may indicate that first fragmented packet 104 is the last fragmented packet associated with the data block and the last fragment of the data block has been received.

Second header 110 may include a source port number field 214 and a destination port number field 216. Source port number field 214 may indicate a logical end point used to transmit first fragmented packet 104. Destination port number field 216 may indicate a logical end point used to receive first fragmented packet 104.

FIG. 2B is a diagram of a header portion of second fragmented packet 118 including third header 120, according to an example. Third header 120 may have the same format as first header 108. Third header 120 may include the same fields as first header 108. For example, third header 120 may include a source address field 218, a destination address field 220, a protocol field 222, an identification field 224, a fragment offset field 226, and a more fragment bit 228.

When first fragmented packet 104 and second fragmented packet 118 are associated with the same data block, source address fields 202 and 218 may indicate the same source address. Destination address fields 204 and 220 may indicate the same destination address. Protocol fields 206 and 222 may indicate the same protocol information. Identification fields 208 and 224 may indicate the same data block identification information.

Fragment offset field 210 may be set to a different value than fragment offset field 226. For example, fragment offset field 210 may be set to a first value, such as a value of 0 or null. Fragment offset field 226 may be set to a second value different from the first value, such as a value of 1. When neither first fragmented packet 104 nor second fragmented packet 118 is the last fragmented packet associated with the data block, more fragment bits 212 and 228 may be set to the same value.

FIG. 3 is a block diagram of a computing device 300 to determine an initial fragmented packet processing resource based on a first hash value and to determine a subsequent fragmented packet processing resource based on a different hash value, according to an example. Computing device 300 may implement computing device 100 of FIGS. 1A-1B. Computing device 300 may include a processor 302 and a computer-readable storage medium 304.

Processor 302 may fetch, decode, and execute instructions 306-318 to control a process of determining an initial fragmented packet processing resource based on a first hash value and to determine a subsequent fragmented packet processing resource based on a different hash value. As an alternative or in addition to retrieving and executing instructions, processor 302 may include at least one electronic circuit that includes electronic components for performing the functionality of instructions 306, 308, 310, 312, 314, 316, 318, or a combination thereof.

Computer-readable storage medium 304 may be any electronic, magnetic, optical, or other physical storage device that contains or stores executable instructions. Thus, computer-readable storage medium 304 may be, for example, Random Access Memory (RAM), an Electrically Erasable Programmable Read-Only Memory (EEPROM), a storage device, an optical disc, etc. In some examples, computer-readable storage medium 304 may be a non-transitory storage medium, where the term "non-transitory" does not encompass transitory propagating signals. As described in detail below, computer-readable storage medium 304 may be encoded with a series of processor executable instructions 306-318 for determining an initial fragmented packet processing resource based on a first hash value and to determine a subsequent fragmented packet processing resource based on a different hash value.

Fragmented packet reception instructions 306 may receive a fragmented packet from a source device. For example, referring to FIG. 1A, computing device 100 may receive first fragmented packet 104 from source device 106. Fragment offset field value determination instructions 308 may determine a value in a fragment offset field of a fragmented packet, such as fragment offset field 210 of FIG. 2A or fragment offset field 226 of FIG. 2B. For example, referring to FIG. 1A, first fragmented packet 104 may be identified as an initial fragmented packet by computing device 100 based on the value of the fragment offset field. As another example, referring to FIG. 1B, second fragmented packet 118 may be identified as a subsequent fragmented packet by computing device 100 based on the value of the fragment offset field.

Hash value generation instructions 310 may generate at least one hash value for use associated with determining a processing resource. For example, referring to FIGS. 1A-1B, computing device 100 may generate the first hash value using information/values from a first subset of the first set of fields of first header 108 and the second set of fields of second header 110. Computing device 100 may generate the second hash value using information/values from a second subset of the first set of fields of first header 108. Further, computing device 100 may generate a third hash value using information/values from the third set of fields.

Initial fragmented packet processing resource determination instructions 312 may determine a processing resource to process an initial fragmented packet, such as first fragmented packet 104. For example, referring to FIG. 1A, computing device 100 may determine an initial fragmented packet processing resource, such a processing resource 112, to process first fragmented packet 104 based on the first hash value. Hash value and fragmented packet processing resource association instructions 314 may associate a hash value with a fragmented packet processing resource for use in determining a subsequent fragmented packet processing resource. For example, referring to FIG. 1B, computing device 100 may associate the second hash value with processing resource 112 via a second hash table 116.

Subsequent fragmented packet processing resource determination instructions 316 may determine a processing resource to process a subsequent fragmented packet, such as second fragmented packet 118. For example, referring to FIG. 1B, when the third hash value matches the second hash value, computing device 100 may determine that processing resource 112 may be the subsequent fragmented packet processing resource.

Fragmented packet transmission instructions 318 may transmit a fragmented packet to a processing resource. For example, referring to FIG. 1A, computing device 100 may transmit first fragmented packet 104 to processing resource 112 for processing and/or reassembly of the data block. As another example, referring to FIG. 1B, computing device 100 may transmit second fragmented packet 118 to the subsequent fragmented packet processing resource.

Figure 4:
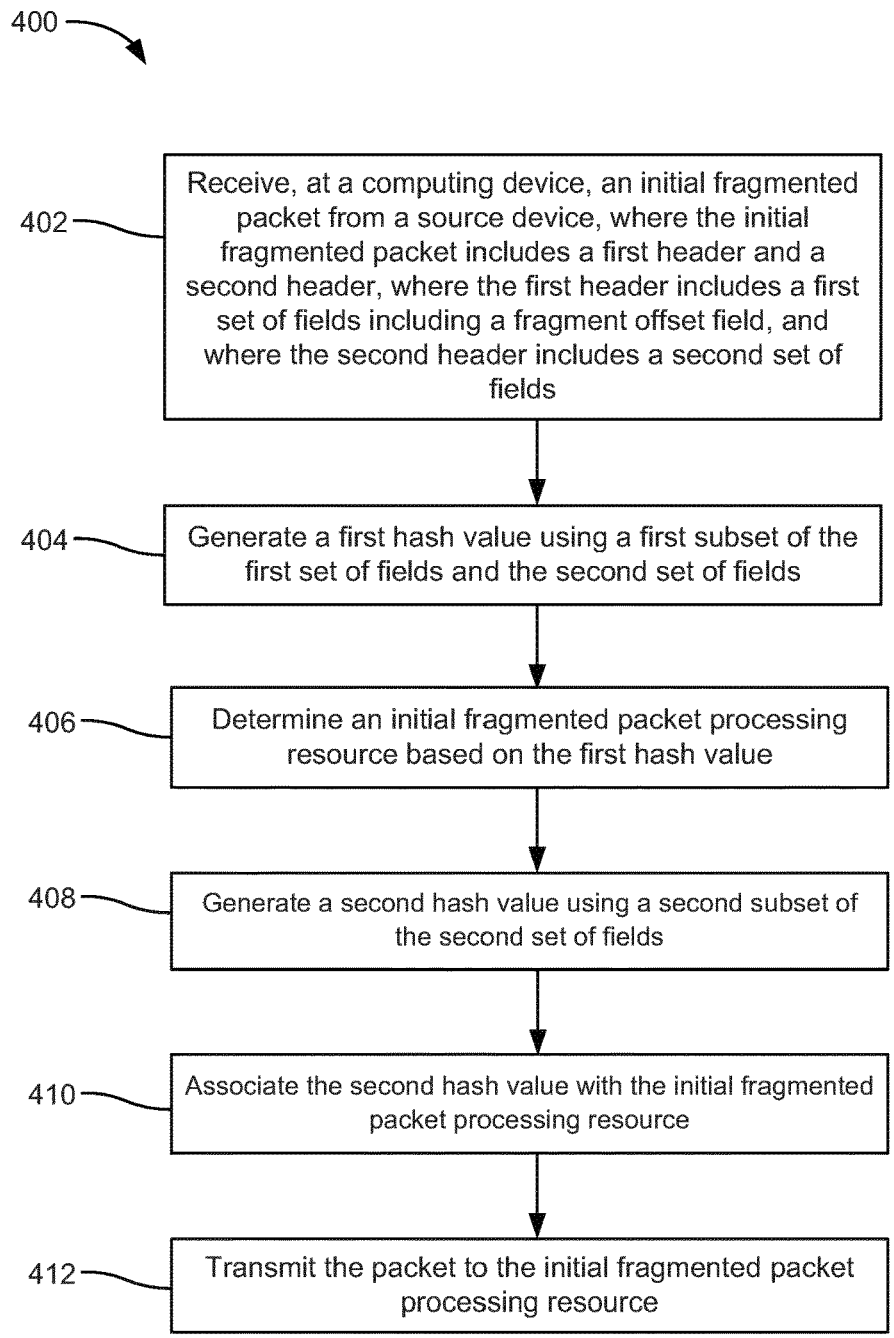
FIG. 4 is a flowchart illustrating a method of operation at a computing device to determine an initial fragmented packet processing resource based on a first hash value and to determine a subsequent fragmented packet processing resource based on a different hash value, according to an example.

FIG. 4 is a flowchart illustrating a method 400 of operation at a computing device to determine an initial fragmented packet processing resource based on a first hash value and to determine a subsequent fragmented packet processing resource based on a different hash value, according to an example. Method 400 may be implemented by computing device 100 of FIGS. 1A-1B and/or computing device 300 of FIG. 3. Method 400 includes receiving, at a computing device, an initial fragmented packet from a source device, where the initial fragmented packet includes a first header and a second header, where the first header includes a first set of fields including a fragment offset field, and where the second header includes a second set of fields, at block 402. For example, referring to FIG. 1A, computing device 100 may receive a first fragmented packet 104 from a source device 106. First fragmented packet 104 may include two headers, such as first header 108 and a second header 110, in a header portion of first fragmented packet 104.

Method 400 also includes generating a first hash value using a first subset of the first set of fields and the second set of fields, at block 404. For example, referring to FIG. 1A, computing device 100 may generate the first hash value using information/values from a first subset of the first set of fields of first header 108 and the second set of fields of second header 110. Method 400 further includes determining an initial fragmented packet processing resource based on the first hash value, at block 406. For example, referring to FIG. 1A, computing device 100 may determine an initial fragmented packet processing resource, such a processing resource 112, to process first fragmented packet 104 based on the first hash value.

Method 400 further includes generating a second hash value using a second subset of the first set of fields, at block 408. For example, referring to FIG. 1B, computing device 100 may generate the second hash value using information/values from a second subset of the first set of fields of first header 108. Method 400 further includes associating the second hash value with the initial fragmented packet processing resource, at block 410. For example, referring to FIG. 1B, computing device 100 may associate the second hash value with processing resource 112 via a second hash table 116. Method 400 further includes transmitting the packet to the initial fragmented packet processing resource, at block 412. For example, referring to FIG. 1A, computing device 100 may transmit first fragmented packet 104 to processing resource 112 for processing and/or reassembly of the data block.

Figure 5:
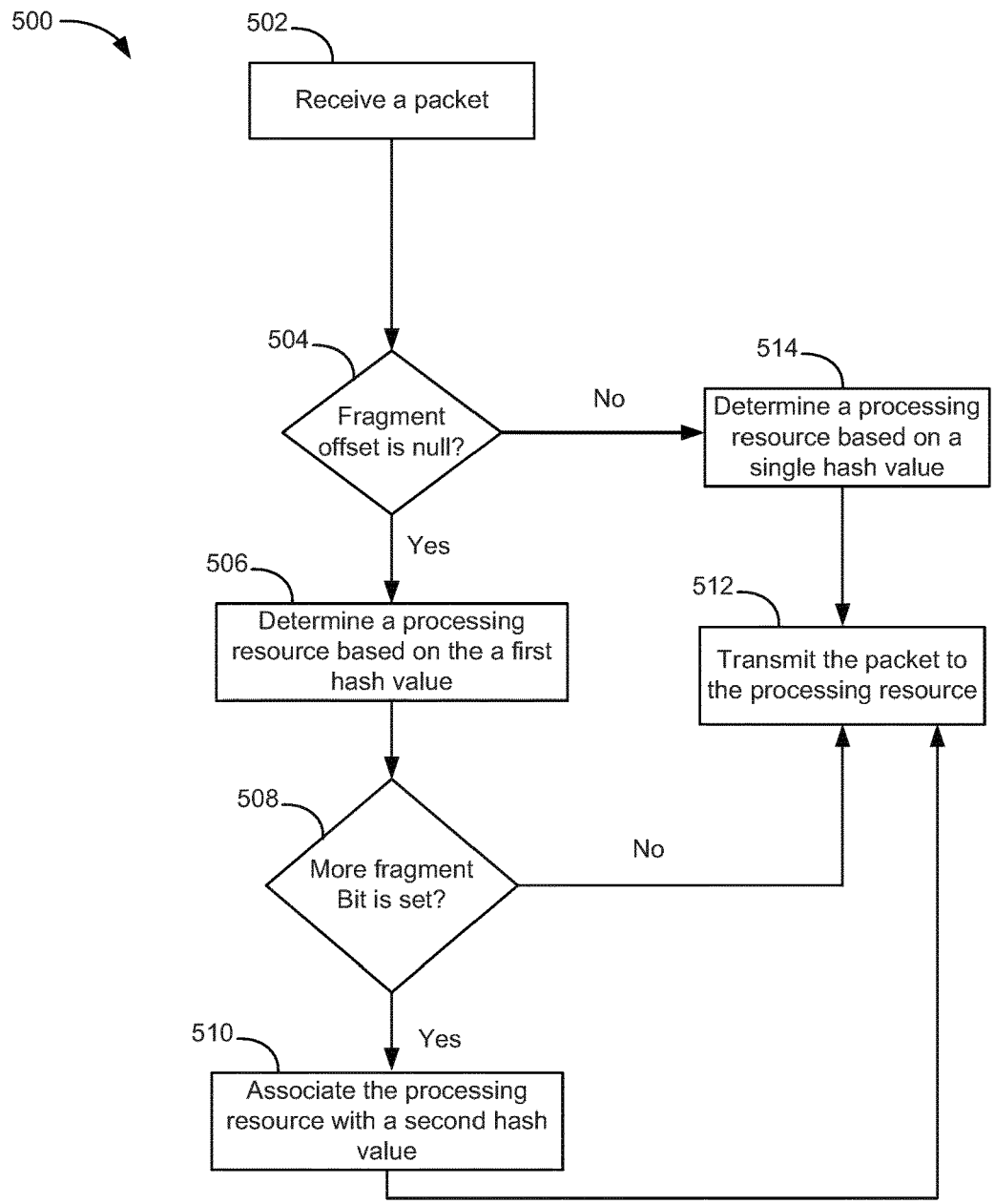
FIG. 5 is a flowchart illustrating a method of operation at a computing device to determine an initial fragmented packet processing resource based on a first hash value and to determine a subsequent fragmented packet processing resource based on a different hash value, according to an example.

FIG. 5 is a flowchart illustrating a method 500 of operation at a computing device to determine an initial fragmented packet processing resource based on a first hash value and to determine a subsequent fragmented packet processing resource based on a different hash value, according to an example. Method 500 may be implemented by computing device 100 of FIGS. 1A-1B and/or computing device 300 of FIG. 3. Method 500 is described with reference to computing device 100.

At block 502, computing device 100 may receive packet from a source device. For example, the packet may be first fragmented packet 104 of FIGS. 1A-1B or second fragmented packet 118. At block 504, computing device 100 may determine whether the value of a fragment offset field of the packet is null. At block 506, in response to a determination that the value of the fragment offset field is null, computing device 100 may determine a processing resource, such as processing resource 112, based on a first hash value. For example, computing device 100 may determine the first hash value using the 5-tuple.

At block 508, computing device 100 may determine whether a more fragment bit is set to a first value (e.g., a value 1). At block 510, in response to a determination that the more fragment bit is set to the first value indicating that there is at least one more fragmented packet to be received, computing device 100 may associate the processing resource with a second hash value, such as by using second hash table 116. Computing device 100 may generate the second hash value using the 4-tuple. At block 512, computing device 100 may transmit the packet to the processing resource. Referring back to block 508, in response to a determination by computing device 100 that the more fragment bit is not set to the first value, method 500 may proceed to block 512 as described above. For example, the more fragment bit may be set to a second value (e.g., a value 0) indicating that the packet is the last fragmented packet of a data block. Thus, there is no more fragmented packet associated with the data block to be received.

Referring back to block 504, in response to a determination by computing device 100 that the value of the fragment offset field is a value other than null, method 500 may proceed to block 514. At block 514, computing device 100 may determine a processing resource based on a single hash value, such as the second hash value. Method 500 may proceed to block 512 as described above.

In some examples, the value of the fragment offset field and the more fragment bit together may indicate whether the packet is an unfragmented packet, an initial fragmented packet, a subsequent fragmented packet, or the last subsequent fragmented packet. When the value of the fragment offset field is null and the more fragment bit not is set to the first value, the packet may be an unfragmented packet. When the value of the fragment offset field is null and the more fragment bit is set to the first value, the packet may be an initial fragmented packet, such as first fragmented packet 104. When the value of the fragmented offset field is not null and the more fragment bit is set to the first value, the packet may be a subsequent fragmented packet, such as second fragmented packet 118. When the value of the fragmented offset field is not null and the more fragment bit is not set to the first value, the packet may be the last subsequent fragmented packet.

The use of "comprising", "including" or "having" are synonymous and variations thereof herein are meant to be inclusive or open-ended and do not exclude additional unrecited elements or method steps.

What is claimed is:

1. An apparatus comprising:
a processor to:
receive an initial fragmented packet from a source device, wherein the initial fragmented packet includes a first header and a second header;
generate a first hash value based on the first header and based on the second header;
determine an initial fragmented packet processing resource based on the first hash value;
generate a second hash value based on the first header;
associate the second hash value with the processing resource; and
transmit the initial fragmented packet to the initial fragmented packet processing resource.

2. The apparatus of claim 1, wherein the first header has a different format than the second header, and the processor to associate the second hash value with the processing resource via a hash table.

3. The apparatus of claim 1, the processor further to:
receive a subsequent fragmented packet from the source device, wherein the subsequent fragmented packet includes a third header, and wherein the third header and the first header have the same format;
generate a third hash value based on the third header;
determine a subsequent fragmented packet processing resource based on the second hash value and based on the third hash value; and
transmit the subsequent fragmented packet to the subsequent fragmented packet processing resource.

4. The apparatus of claim 3, wherein the subsequent fragmented packet processing resource corresponds to the processing resource when the second hash value matches the third hash value, and wherein the subsequent fragmented packet processing resource and the initial fragmented packet processing resource are the same.

5. The apparatus of claim 3, wherein the initial fragmented packet corresponds to a first fragment of a data block, wherein the subsequent fragmented packet corresponds to a subsequent fragment of the data block, the processor to transmit the fragmented packet prior to the subsequent fragmented packet.

6. The apparatus of claim 1, wherein the processing resource includes a particular processor, a set of processor executable instructions, or a combination thereof.

7. The apparatus of claim 1, wherein the first header corresponds to an Internet protocol (IP) header, and wherein the second header corresponds to a user datagram protocol (UDP) header.

8. A method comprising:
receiving, at a computing device, an initial fragmented packet from a source device, wherein the initial fragmented packet includes a first header and a second header, wherein the first header includes a first set of fields including a fragment offset field, and wherein the second header includes a second set of fields;
generating a first hash value using a first subset of the first set of fields and the second set of fields;
determining an initial fragmented packet processing resource based on the first hash value;
generating a second hash value using a second subset of the first set of fields;
associating the second hash value with the initial fragmented packet processing resource; and
transmitting the packet to the initial fragmented packet processing resource.

9. The method of claim 8, wherein the first subset includes a source address field, a destination address field, and a protocol field, and wherein the second set of fields includes a source port number field and a destination port number field.

10. The method of claim 8, wherein the second subset includes a source address field, a destination address field, a protocol field, and an identification field.

11. The method of claim 8, wherein the first header includes a more fragment bit, wherein the second hash value is generated based on the more fragment bit.

12. A non-transitory computer-readable storage medium comprising instructions that when executed cause a processor of a computing device to:

receive a fragmented packet from a source device, wherein the fragmented packet includes a first header including a fragment offset field;

in response to a determination that the fragment offset field has a first value:

generate a first hash value based on the first header and based on a second header of the fragmented packet;

determine an initial fragmented packet processing resource based on the first hash value;

generate a second hash value based on the first header; and associate the second hash value with the initial fragmented packet processing resource; and in response to a second determination that the fragment offset field has a second value:

generate a single hash value based on the first header; and determine a subsequent fragmented packet processing resource based on the single hash value; and transmit the fragmented packet to one of the initial fragmented packet processing resource and the subsequent fragmented packet processing resource.

13. The non-transitory computer-readable storage medium of claim 12, wherein the instructions when executed further cause the processor to generate the single hash value using a source address field of the first header, a destination address field of the first header, a protocol field of the first header, and an identification field of the first header.

14. The non-transitory computer-readable storage medium of claim 12, wherein the instructions when executed further cause the processor to generate the first hash value using a source port number field of the second header, a destination port number field of the second header, a source address field of the first header, a destination address field of the first header, and a protocol field of the first header.

15. The non-transitory computer-readable storage medium of claim 12, wherein the first header corresponds to an Internet protocol (IP) header, and wherein the second header corresponds to a user datagram protocol (UDP) header.

* * * * *